US012747692B1

(12) United States Patent
Zelesky et al.

(10) Patent No.: US 12,747,692 B1
(45) Date of Patent: Sep. 29, 2026

(54) AIRFRAME-INTEGRATED WATER INJECTION STORAGE SYSTEM AND METHODS OF USING

(71) Applicant: RTX Corporation, Farmington, CT (US)

(72) Inventors: Mark F. Zelesky, Bolton, CT (US); Neil J. Terwilliger, Cheshire, CT (US); Carroll V. Sidwell, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/219,604

(22) Filed: May 27, 2025

(51) Int. Cl.
*F02C 3/30* (2006.01)
*B64D 27/33* (2024.01)
*B64D 37/04* (2006.01)

(52) U.S. Cl.
CPC ................ *F02C 3/30* (2013.01); *B64D 27/33* (2024.01); *B64D 37/04* (2013.01)

(58) Field of Classification Search
CPC ........... F02C 3/30; B64D 27/33; B64D 27/02; B64D 27/24; B64D 37/04; B64D 2033/024
See application file for complete search history.

(56) References Cited

U.S. PATENT DOCUMENTS

| | | | | |
|---|---|---|---|---|
| 8,239,972 | B2 | 8/2012 | Dwyer | |
| 11,530,635 | B2 | 12/2022 | Kupratis | |
| 2011/0239656 | A1 | 10/2011 | Crume | |
| 2022/0281615 | A1* | 9/2022 | Hillel | F17C 1/00 |
| 2023/0356856 | A1* | 11/2023 | Gilmore | B64D 37/04 |

* cited by examiner

*Primary Examiner* — Rodney A Bonnette
(74) *Attorney, Agent, or Firm* — Getz Balich LLC

(57) ABSTRACT

A system for an aircraft includes a propulsion unit, a water augmentation system, an airframe, a removable water tank, and a coupling system. The airframe includes a water storage compartment and a water delivery system. The water delivery system is in fluid communication with the water augmentation system and the water storage compartment. The removable water tank is receivable within the water storage compartment and is configured for fluid communication with the water augmentation system. The coupling system is configured to transition between an extended position and a retracted position. In the extended position, the coupling system is disposed between the removable water tank and the water delivery system. In the retracted condition, the coupling system is disposed within the removable water tank or the water delivery system.

19 Claims, 10 Drawing Sheets

AIRFRAME-INTEGRATED WATER INJECTION STORAGE SYSTEM AND METHODS OF USING

BACKGROUND OF THE INVENTION

1. Technical Field

The present disclosure relates to a water injection storage system, in general, and to a water injection storage system which can be integrated on demand into an airframe, in particular.

2. Background Information

Water injection for added thrust utilizes water injection storage which is integrally mounted within an aircraft airframe. Regardless of whether water injection is needed for a given flight, conventional water injection storage systems will always occupy a given volume and weight within the airframe, which can be detrimental to fuel economy and/or cargo volume. Thus, there is a need in the art for water injection storage systems which can reduce weight and/or volume of water injection storage systems within an airframe.

SUMMARY

According to an aspect of the present disclosure, a system for an aircraft is provided. The system includes a propulsion unit, a water augmentation system, an airframe, a removable water tank, and a coupling system. The airframe includes a water storage compartment and a water delivery system. The water delivery system is in fluid communication with the water augmentation system and the water storage compartment. The removable water tank is receivable within the water storage compartment and is configured for fluid communication with the water augmentation system. The coupling system is configured to transition between an extended position and a retracted position. In the extended position, the coupling system is disposed between the removable water tank and the water delivery system. In the retracted condition, the coupling system is disposed within the removable water tank or the water delivery system.

In any aspects or embodiments described above and herein, the coupling system includes a connector arm and a flexible connector. The connector arm is movable between the extended position and the retracted position to transition the flexible connector between an engaged condition and a disengaged condition. In the engaged condition the coupling system is secured to a manifold of the water delivery system and the removable water tank such that fluid communication is established between the manifold and the removable water tank.

In any aspects or embodiments described above and herein, the coupling system is arranged with the removable water tank.

In any aspects or embodiments described above and herein, the water delivery system includes a manifold, and the coupling system is arranged with the manifold.

In any aspects or embodiments described above and herein, the water storage compartment is arranged with a cargo hold of the airframe. Other items may be stored and removed from the cargo hold without removing the removable water tank.

In any aspects or embodiments described above and herein, the removable water tank includes an actuator and a latching mechanism. The latching mechanism is configured to transition between a locked position and an unlocked position. The actuator may be configured to transition the latching mechanism between the locked position and the unlocked position. In the locked position, the latching mechanism engages the water delivery system. In the unlocked position, the latching mechanism is disengaged from the water delivery system.

In any aspects or embodiments described above and herein, the removable water tank includes a supply port, a return port, and an electrical connector. The supply port is disposed on an exterior surface of the removable water tank and in fluid communication with a supply reservoir. The supply reservoir is disposed within a water tank interior and configured to store source water usable by the water augmentation system. The return port is disposed on the exterior surface of the removable water tank and in fluid communication with a drain reservoir. The drain reservoir disposed within the water tank interior. The electrical connector is configured to establish an electrical connection between the removable water tank and the water augmentation system.

The aircraft may include an electronic engine controller, and the removable water tank may include a controller. The electrical connector may be configured to establish electrical communication between the controller and the electronic engine controller. The water delivery system may be configured to supply water from the supply reservoir to the water augmentation system and to purge water from the water augmentation system to the drain reservoir.

In any aspects or embodiments described above and herein, the water augmentation system is configured to inject water into a combustor section to reduce an exit temperature of combustion gases exiting the combustor section.

In any aspects or embodiments described above and herein, the water delivery system includes a plurality of water transport lines and a manifold. The plurality of water transport lines fluidly connect the manifold to the water augmentation system. The plurality of water transport lines are integrated into the airframe and configured to direct water from the water storage compartment, through the manifold, to the water augmentation system.

According to an aspect of the present disclosure, an aircraft propulsion system is provided. The system includes a propulsion unit, a water augmentation system, an airframe, a water delivery system, a water tank, a controller and a coupling system. The propulsion unit includes a core flowpath, a compressor section and a combustor. The water augmentation system includes at least one location where water is communicated into the core flowpath. The airframe includes a water storage compartment. The water delivery system is configured to supply water to the water augmentation system. The water tank is configured to store and supply water to the water delivery system, and is removably mounted with the water storage compartment. The controller is programmed to control a flow of the water from the water tank to the water augmentation system. The coupling system configured to removable couple the water delivery system and water tank in fluid communication.

In any aspects or embodiments described above and herein, the water delivery system includes a manifold and water transport lines. The water transport lines fluidly connect the manifold to the water augmentation system. The water transport lines are arranged integral with the airframe, and the manifold is in fluid communication with the water storage compartment.

In any aspects or embodiments described above and herein, the water storage compartment comprises a portion of a cargo hold within the airframe.

In any aspects or embodiments described above and herein, the coupling system includes a connector arm and a flexible connector. The connector arm is movable between an extended position and a retracted position to transition the flexible connector between an engaged condition and a disengaged condition. In the engaged condition the coupling system is fluidly coupled to the water delivery system and the water tank.

In any aspects or embodiments described above and herein, the water tank includes a supply port, a return port, and an electrical connector. The supply port is disposed on an exterior surface of the water tank and in fluid communication with a supply reservoir. The supply reservoir is configured to store source water usable by the water augmentation system, and is disposed within a water tank interior. The return port is disposed on the exterior surface of the water tank and in fluid communication with a drain reservoir. The drain reservoir disposed within the water tank interior. The electrical connector is configured to establish an electrical connection between the water tank and the water augmentation system.

According to an aspect of the present disclosure, removable water tank for use with a water augmentation system of an aircraft is provided. The removable water tank includes a body, an interior, supply port, a return port, and a coupling system. The body includes a tank base, a tank top, and tank sidewalls connecting base and the top. The interior includes a supply reservoir, a drain reservoir, a pump and a water quality sensor. The supply reservoir is configured to store source water usable by the water augmentation system, and the drain reservoir is configured to store purge water used by the water augmentation system. The supply port is disposed on an exterior surface of the tank body and in fluid communication with the supply reservoir. The return port is disposed on the exterior surface of the removable water tank and in fluid communication with a drain reservoir. The coupling system is configured to secure the tank body to the aircraft in an engaged condition, and release the tank body from the aircraft in a disengaged condition.

In any aspects or embodiments described above and herein, the removable water tank includes an electrical connector configured to establish an electrical connection between the removable water tank and the water augmentation system.

In any aspects or embodiments described above and herein, the removable water tank includes an actuator configured to transition the coupling system between the engaged condition and the disengaged condition.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
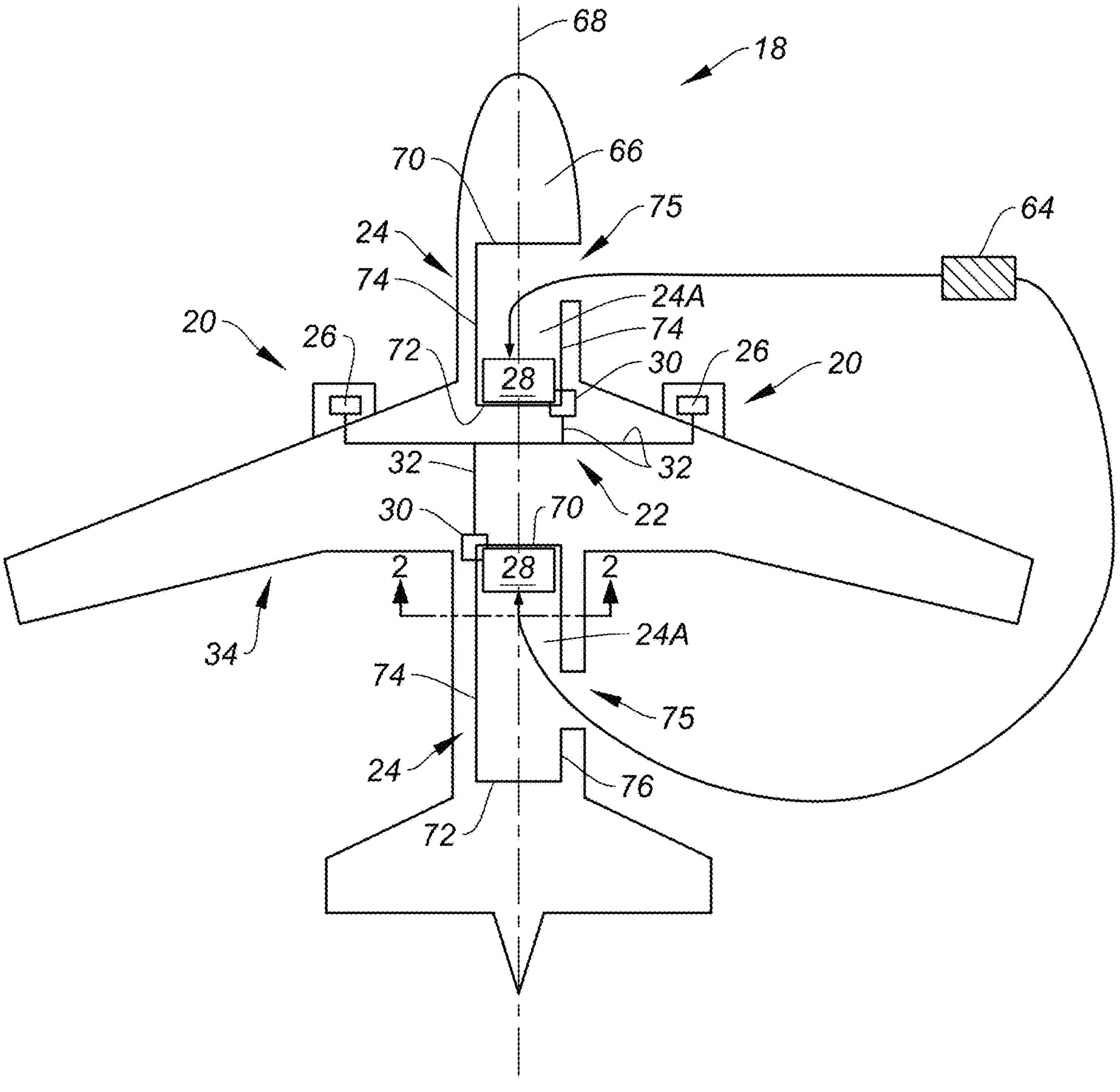
FIG. 1 is a schematic illustration of an aircraft according to an embodiment of the present disclosure.

FIG. 1 schematically illustrates an aircraft 18, propulsion unit(s) 20, water delivery system 22, cargo holds 24, and water augmentation system(s) 26. Each cargo hold 24 includes a water storage compartment 28 configured to store water utilized by the water augmentation system 26. Each water storage compartment 28, for example, may be in fluid communication with the water augmentation system 26 via the water delivery system 22. The water delivery system 22 includes a manifold 30 in communication with a respective water storage compartment 28 and water transport lines 32 connecting the manifold 30 to the water augmentation system 26. The water transport lines 32 of FIG. 1 may comprise plumbing (e.g., ducts, tubing) integrated into an airframe 34 of the aircraft and configured to direct water from the water storage compartment 28, through the manifold 30, to the water augmentation system 26.

The propulsion unit 20 of FIG. 1 is provided to facilitate the description herein. The propulsion unit 20 of the present disclosure may be, for example, a gas turbine engine. The present disclosure is not limited to any particular engine configuration for the propulsion unit 20, and may be utilized with single spool gas turbine engines, two-spool gas turbine engines, three spool gas turbine engines and the like. The propulsion unit 20 may be configured as a turbofan engine, a turbojet engine, a turboprop engine, a turboshaft engine, a propfan engine, a pusher fan engine or any other type of gas turbine engine. While two (2) propulsion units are depicted in FIG. 1, the aircraft of the present disclosure may include any number of propulsion units. The propulsion unit 20 of the present disclosure therefore is not limited to any particular types or configurations of engines.

Figure 1A:
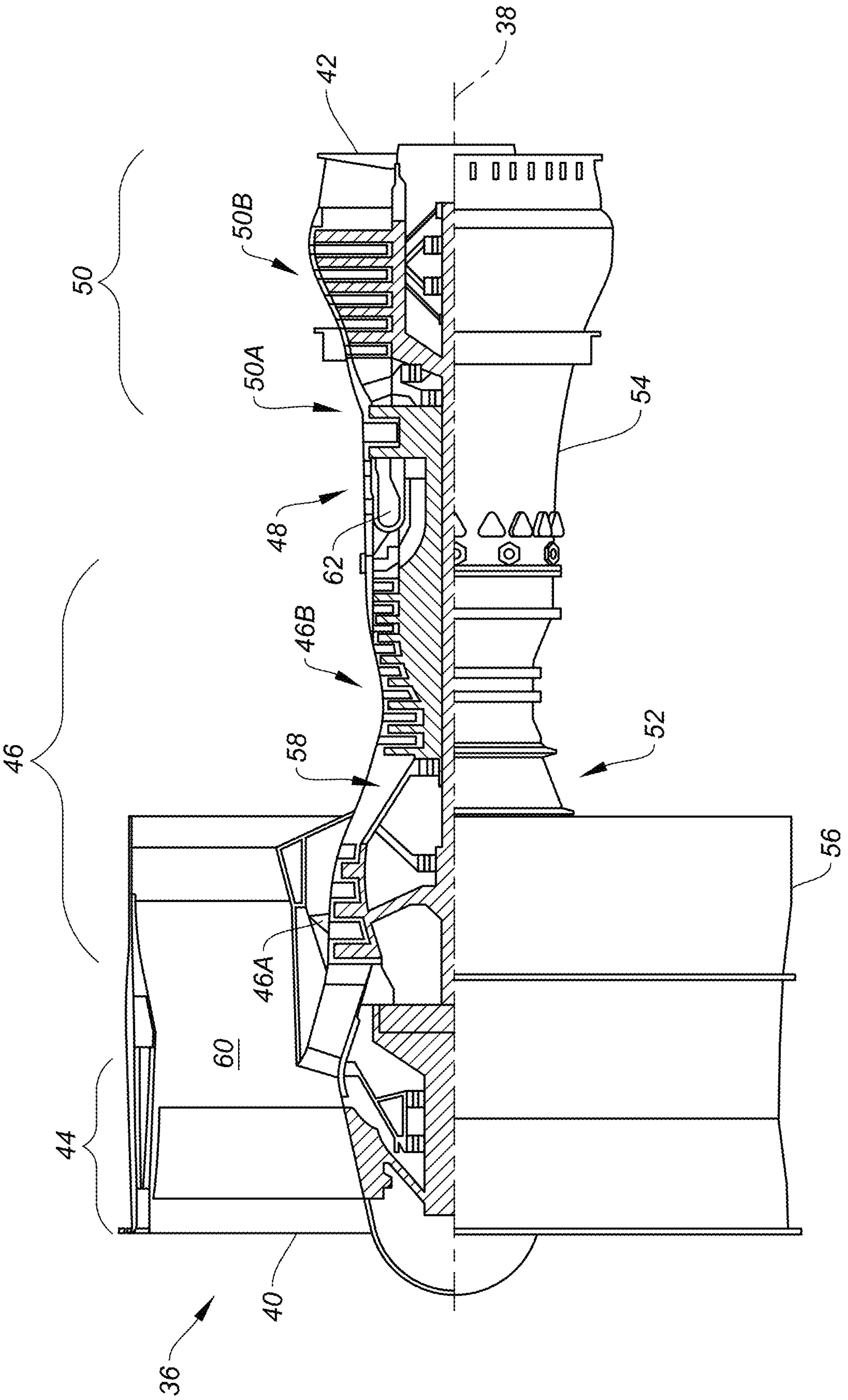
FIG. 1A is a side cutaway illustration of a geared gas turbine engine.

FIG. 1A illustrates an exemplary gas turbine engine 36 forming a propulsion unit of the present disclosure. This turbine engine 36 extends along an axial centerline 38 between an upstream airflow inlet 40 and a downstream airflow exhaust 42. The turbine engine 36 includes a fan section 44, a compressor section 46, a combustor section 48 and a turbine section 50. The compressor section 46 includes a low pressure compressor (LPC) section 46A and a high pressure compressor (HPC) section 46B. The turbine section

50 includes a high pressure turbine (HPT) section 50A and a low pressure turbine (LPT) section 50B.

The engine sections 44-50 are arranged sequentially along the centerline 38 within an engine housing 52. This engine housing 52 includes an inner case 54 (e.g., a core case) and an outer case 56 (e.g., a fan case). The inner case 54 may house one or more of the engine sections 46A-50B; e.g., a core of the turbine engine 36. The outer case 56 may house at least the fan section 44.

During turbine engine operation, air enters the turbine engine 36 through the airflow inlet 40. This air is directed through the fan section 44 and into a core flowpath 58 and a bypass flowpath 60. The core flowpath 58 extends sequentially through the engine sections 46A-50B; e.g., the engine core. The air within the core flowpath 58 may be referred to as "core air". The bypass flowpath 60 extends through a bypass duct, which bypasses the engine core. The air within the bypass flowpath 60 may be referred to as "bypass air".

The core air is compressed by the LPC section 46A and the HPC section 46B are directed into a combustor 62 in the combustor section 48. Fuel is injected into the combustion section 48 and mixed with the compressed core air to provide a fuel-air mixture. This fuel-air mixture is ignited and combustion products thereof flow through and sequentially cause rotors of the HPT section 50A and the LPT section 50B to rotate. The rotation of the HPT section 50A and the LPT section 50B respectively drive rotation of rotors of the HPC section 46B and the LPC section 46A and, thus, compression of the air received from a core airflow inlet. The rotation of the LPT section 50B also drives rotation of the fan section 44. The rotation of a rotor of the fan section 44 propels the bypass air through and out of the bypass flowpath 60. The propulsion of the bypass air may account for a majority of thrust generated by the turbine engine 36, e.g., more than seventy-five percent (75%) of engine thrust. The turbine engine 36 of the present disclosure, however, is not limited to the foregoing exemplary thrust ratio.

Referring to FIG. 1, the water augmentation system 26 is configured to augment operation of the propulsion unit 20 according to a selected mode utilizing the water delivery system 22. A removable water tank 64 can be installed within the water storage compartment 28 and/or the cargo hold 24 to facilitate both water augmented operation and non-water augmented operation of the propulsion unit 20. Removal of the water tank 64 from the water storage compartment 28 provides additional space within the cargo hold 24 and reduction in weight during flights which do not require use of the water augmentation system 26.

The water augmentation system 26 includes a water transport and control system that provides for filling, storage, and communication of water to locations within the propulsion unit 20 as needed to provide the desired water augmentation according to a selected mode of operation. The water transport and control system may, for example, provide water to the compressor section or the combustor section of the propulsion unit 20. In an exemplary mode of operation, the water augmentation system 26 may be configured to reduce an exit temperature of combustion gases exiting the combustor section within the propulsion unit 20 during take-off and climb operations of the aircraft. Other modes of operation for the water augmentation system 26 are not meant to be precluded.

Each cargo hold 24 of FIG. 1 may be disposed within a fuselage 66 of the aircraft and extends axially along a central axis 68 from a forward cargo hold end 70 and an aft cargo hold end 72. Each cargo hold 24 extends laterally within the fuselage 66 from between lateral sides 74 of the cargo hold 24. Each cargo hold 24 includes a cargo storage compartment 24A and water storage compartment 28, which are accessible from an exterior of the fuselage 66 by compartment openings 75. The water storage compartment 28 may occupy a predetermined volume of the cargo hold 24, for example, between about five percent (5%) to about twenty percent (20%) of the total volume of the cargo hold 24.

Figure 2:
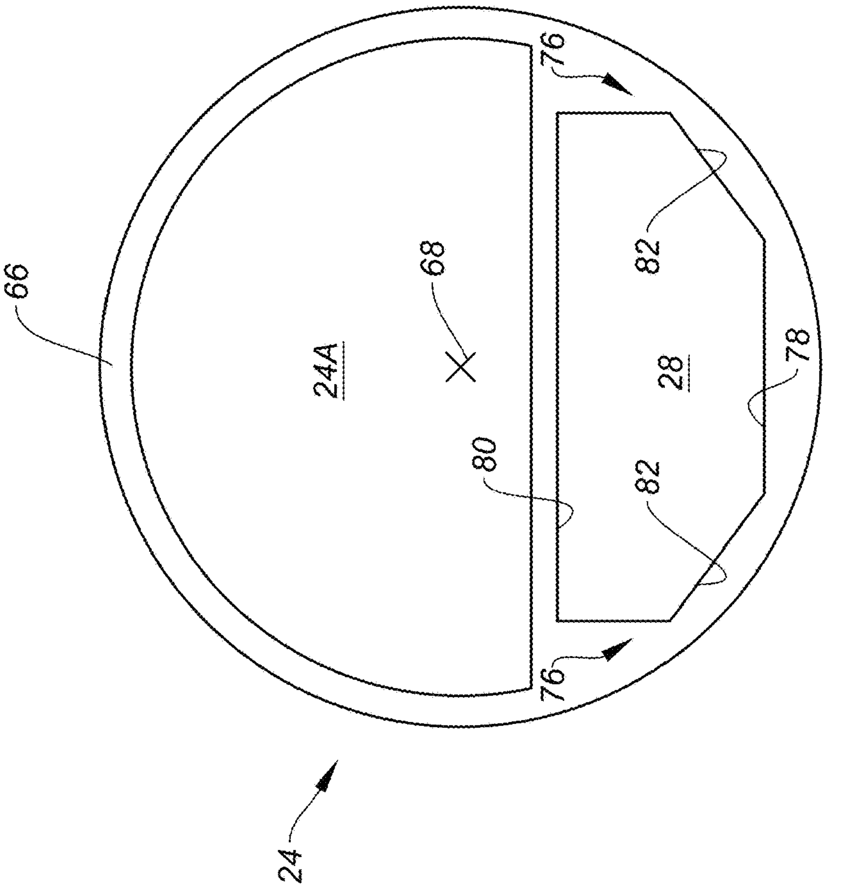
FIG. 2 is a cross-sectional illustration of a portion of the aircraft in FIG. 1, along lines 2-2.

Referring to FIG. 2, the cargo storage compartment 24A and the water storage compartment 28 are disposed within the fuselage 66 and extend circumferentially about at least a portion of the central axis 68. The cargo storage compartment 24A of FIG. 2 may be located, for example, at the gravitational top of the fuselage 66, and the water storage compartment 28 may be located, for example, at the gravitational bottom of the fuselage 66. Other configurations of the cargo storage compartment 24A and/or the water storage compartment 28 are not meant to be precluded. The water storage compartment 28 of FIG. 2 is radially spaced from the cargo storage compartment 24A and is defined by lateral sidewalls 76 extending between a base segment 78 and a top segment 80. A portion of the lateral sidewalls 76 may include taper segments 82, providing the water storage compartment 28 with a hexagonal cross-sectional geometry. Other cross-sectional geometries of the water storage compartment 28 are not meant to be precluded.

Figure 3:
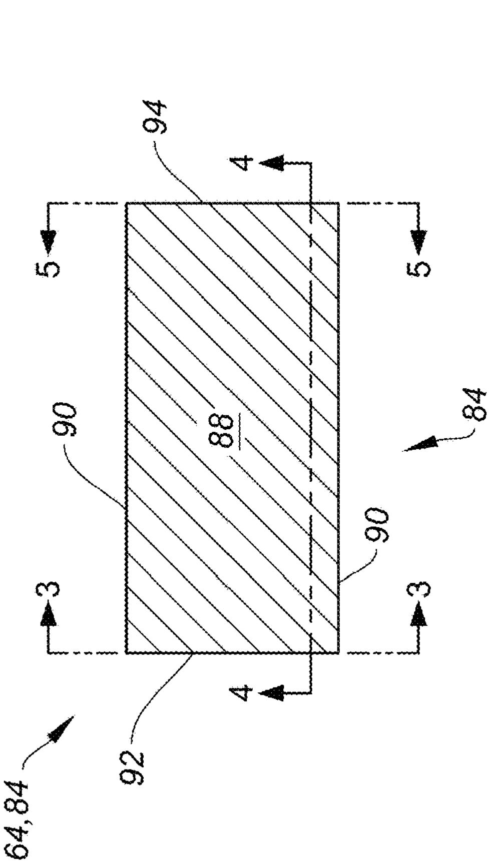
FIG. 3 is a diagrammatic view of a removable water tank according to an embodiment of the present disclosure.
Figure 3A:
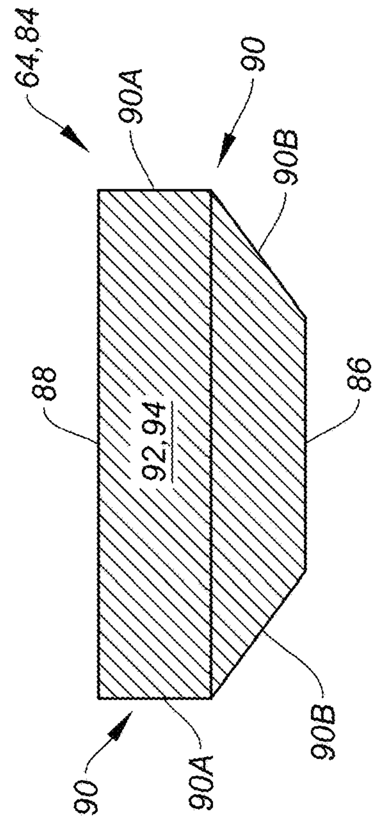
FIG. 3A is a diagrammatic view of the removable water tank of FIG. 3.

With additional reference to FIGS. 3 and 3A, a body 84 of the removable water tank 64 includes a tank base 86, a tank top 88, and tank sidewalls 90 connecting the tank base 86 to the tank top 88. The tank sidewalls 90 may include a vertical sidewall segment 90A and a tapered sidewall segment 90B. The vertical sidewall segment 90A may extend between and connect the tapered sidewall segment 90B to the tank top 88. The tapered sidewall segment 90B may extend between and connect the vertical sidewall segment 90A to the tank base 86. The removable water tank 64 extends laterally between the tank sidewalls 90 and extends longitudinally between a forward face 92 and a rearward face 94. The removable water tank 64 is configured to fit within the cargo hold 24 and, more specifically, the water storage compartment 28. The removable water tank 64 of FIG. 3A, for example, may include a cross-sectional geometry which corresponds to the cross-sectional geometry of the water storage compartment 28. The removable water tank 64 may, for example, be sized to fit within the water storage compartment 28 in a clearance or transition fit. The water storage compartment 28 is arranged in the cargo hold 24 such that other items may be stored and removed from the water storage compartment 28, the cargo storage compartment 24A, or both without removing the removable water tank 64.

Figure 5:
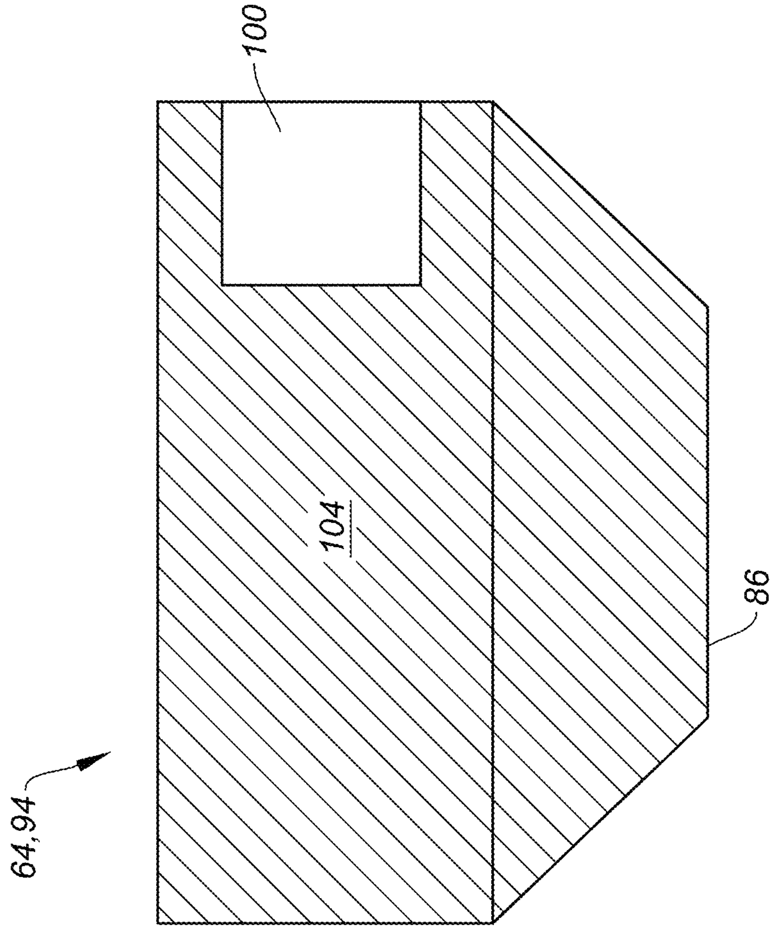
FIG. 5 is a diagrammatic cross-sectional view of the removable water tank of FIG. 3, along lines 5-5.
Figure 4:
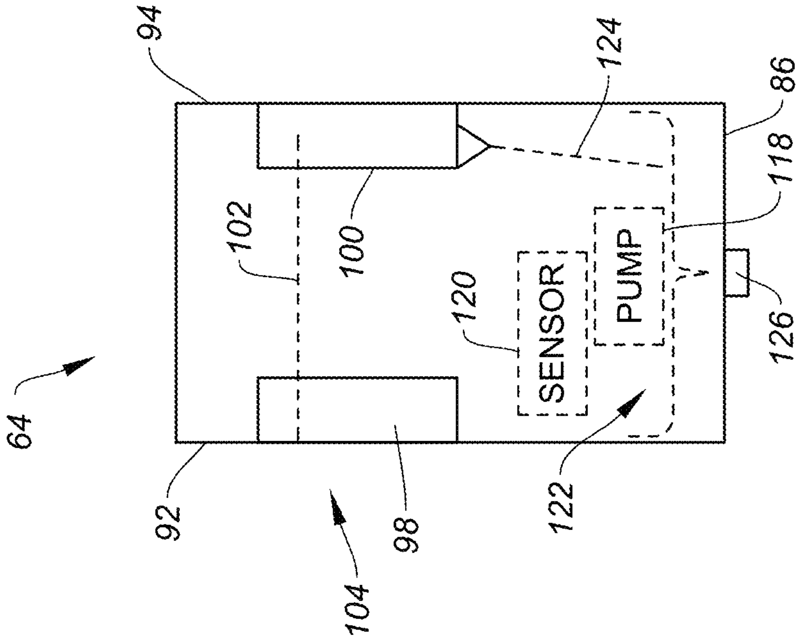
FIG. 4 is a diagrammatic cross-sectional view of the removable water tank of FIG. 3, along lines 4-4.

FIGS. 3-5 depict various sectional views of the removable water tank 64 according to the present disclosure. Referring to FIGS. 3-5, the removable water tank 64 includes an interior 96, a control box 98, and a connector box 100. A linkage 102 couples the control box 98 to the connector box 100 in mechanical and/or electrical communication.

The control box 98 may be disposed on an exterior surface 104 of the removable water tank 64 such as, for example, the forward face of the water tank 64. Other locations for the connector box 100 are not meant to be precluded. The control box 98 includes an actuator 106 and a controller 108. The actuator 106 is configured to engage and disengage various components of the connector box 100 with the manifold 30 (FIG. 1) through the linkage 102. The controller 108 may be implemented with a combination of hardware and software. The hardware may include at least one processing device 110 and a memory 112, which processing device may include one or more single-core and/or multi-core processors. The hardware may also or alternatively include analog and/or digital circuitry other than that described above.

The memory 112 is configured to store software (e.g., program instructions) for execution by the processing device 110, which software execution may control and/or facilitate performance of one or more operations such as those described below. The memory 112 may be a non-transitory computer readable medium. For example, the memory 112 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 3B:
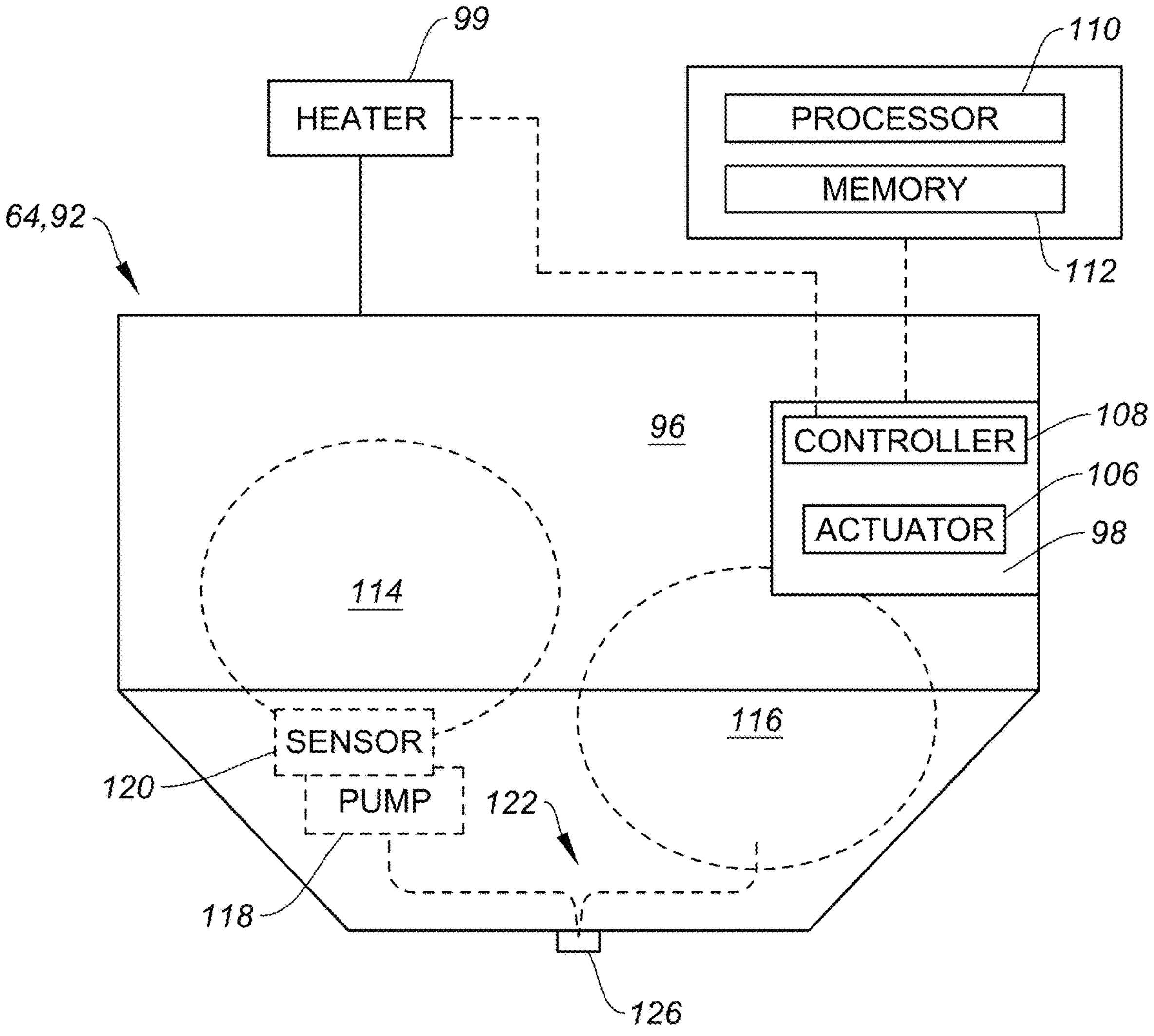
FIG. 3B is a diagrammatic cross-sectional view of the removable water tank of FIG. 3, along lines 3-3.

The removable water tank interior 96 of FIG. 3B includes a supply reservoir 114, a drain reservoir 116, a pump 118, a water quality sensor 120 and a sump 122. The supply reservoir 114 is configured to contain a volume of water which is utilized by the water augmentation system 26 of the propulsion unit 20. Though not illustrated, the supply reservoir 114 may additionally include a quantity sensor configured to determine an amount of water held in the supply reservoir 114. The pump 118 (e.g., a water pump) is disposed in fluid communication with the supply reservoir 114 and is configured to deliver water stored within the water reservoir to the manifold 30 of the water delivery system 22. More specifically, the pump 118 is configured to direct a flow of water from the supply reservoir 114 to the connector box 100 through one or more fluid lines 124 (see e.g., FIG. 5A) within the interior 96 of the water tank 64. The operational parameters of the pump 118 (e.g., ON/OFF, a flow rate) may be determined by the controller 108. The removable water tank 64 is fluidly sealed to prevent water within the removable water tank 64 from escaping during maneuvering operations of the aircraft.

The water quality sensor 120 of FIG. 3 is disposed downstream of the supply reservoir 114 and upstream of the pump 118. The water quality sensor 120 is configured to determine a quality condition of water egress between the supply reservoir 114 and the pump 118. The water quality sensor 120 may be, for example, a conductivity sensor configured to detect the total dissolved solids (TDS) within water flowing from the supply reservoir 114. Other types of sensors, such as pressure sensors and/or temperature sensors, are not meant to be precluded. Upon determining that the quality condition of water flowing between the supply reservoir 114 and the pump 118 is outside a predetermined threshold, the water quality sensor 120 may signal the controller 108 to cease operation of the pump 118.

The drain reservoir 116 is in fluid communication with the connector box 100 through one or more fluid lines 124 (see e.g., FIG. 5A) within the interior 96 of the water tank 64. The drain reservoir 116 is configured to receive and store a flow of fluid which has been recovered by the water augmentation system 26 of the propulsion unit 20. The sump 122 is disposed downstream of the drain reservoir 116 and the supply reservoir 114, and is arranged within the interior 96 of the water tank 64 adjacent the tank base. The sump 122 is in fluid communication with the supply reservoir 114, the drain reservoir 116, and an outlet 126 disposed on the tank base. The sump 122 is configured to receive water located within the supply reservoir 114 and the drain reservoir 116, for example, during service operations of the water tank 64. During service operations, water received by the sump 122 may be removed from the interior 96 of the water tank 64 via the outlet 126.

In some embodiments, a heater (e.g., an electric heater) 99 may be provided with the removable water storage tank 64. The heater 99 may be configured to wrap around a tank exterior surface 104, as well as one or more fluid lines 124 (see FIG. 5A) to prevent freezing of water located within the removable water tank 64, manifold 30, and/or water transport lines 32 (see FIG. 1). The controller 108 may further be programmed to facilitate operation of the heater 99.

Figure 5A:
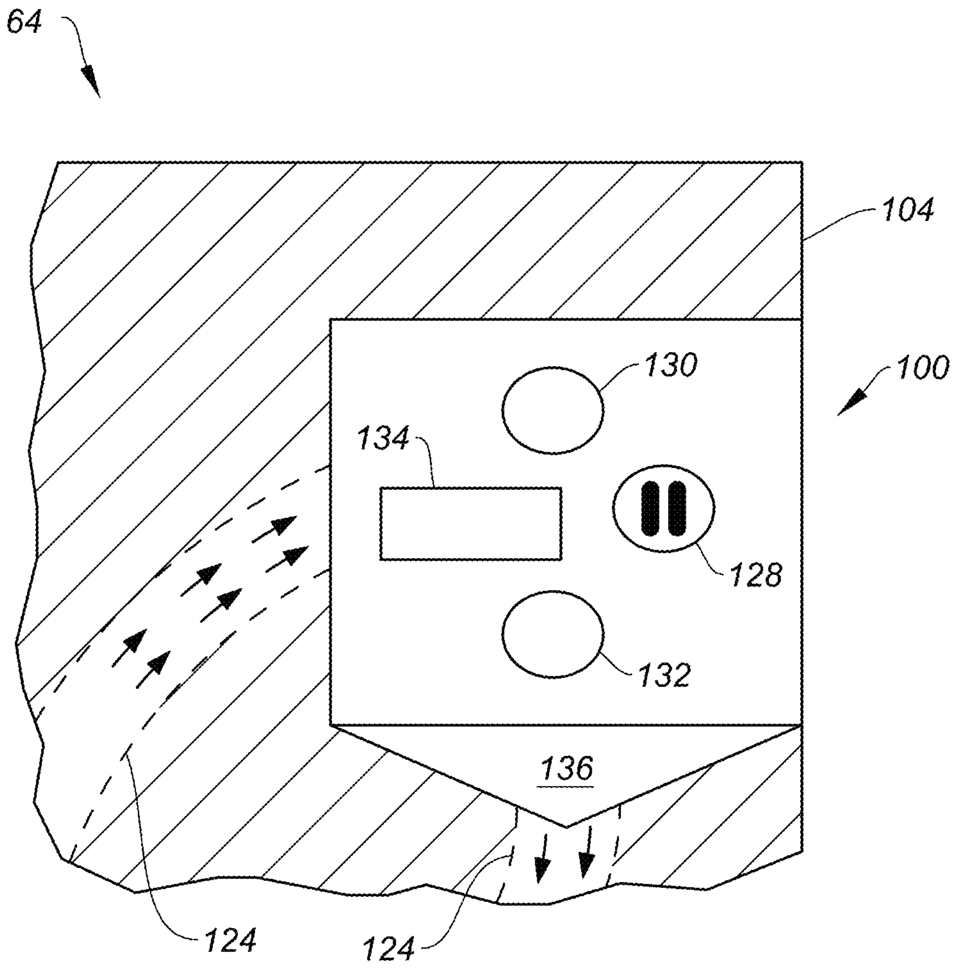
FIG. 5A is an enlarged diagrammatic view a portion of the removable water tank of FIG. 5, displaying a connector box.

Referring to FIGS. 5 and 5A, the connector box 100 is disposed within the water tank 64 such that at least a portion of the connector box 100 is recessed from the exterior surface 104 of the water tank 64. The connector box 100, for example, may be recessed from the rearward face of the water tank 64, opposite the control box 98. Other arrangements for the connector box 100 are not meant to be precluded.

The connector box 100 includes an electrical connector 128, a supply port 130, a return port 132, a latching mechanism 134 and a connector box sump 136. One or more of the electrical connector 128, supply port 130, return port 132, and latching mechanism 134 may move between a locked position and an unlocked position upon actuation of the actuator 106 at the control box 98. By way of example, when signaled by the actuator 106 to move to the locked position, the linkage 102 may cause the latching mechanism 134 of the connector box 100 to extend from within the connector box 100 towards the manifold 30 and mechanically engage the manifold 30 of the water delivery system 22 to secure the removable water tank 64 within the water storage compartment 28. When signaled by the actuator 106 to move the unlocked position, the linkage 102 may cause the latching mechanism 134 to mechanically disengage from the manifold 30 and retract towards the removable water storage tank.

The supply port 130 is configured to establish fluid communication between the manifold 30, the supply reservoir 114, and the pump 118 through the one or more fluid lines 124. The return port 132 is configured to establish fluid communication between the manifold 30 and the drain reservoir 116 through the one or more fluid lines 124. The connector box sump 136 is arranged in fluid communication with the sump 122 of the tank interior 96 to capture any flow leakage between the connector box 100 and the manifold 30.

The electric connector is configured to engage with the manifold 30 and establish electrical and/or electronic communication between the controller 108 and an electronic engine controller (not shown) for the aircraft to control the supply (e.g., flow) of water within the water tank 64 to and from the water augmentation system 26. The electronic engine controller may be, for example, part of a full authority digital engine control (FADEC) system for the aircraft.

Referring to FIGS. 6-10 a coupling system 138 configured to transition between an extended position and a retracted position to engage and/or disengage the removable water tank 64 with the water delivery system 22 is illustrated. The coupling system 138 may be arranged within the removable water tank 64 (see e.g., FIGS. 6-8). The coupling system 138 may alternatively or additionally be arranged within the manifold 30 of the water delivery system 22 (see e.g., FIGS. 9 and 10). The coupling system 138 of FIGS. 6-10 includes a connector arm 140 and a flexible connector 142. The flexible connector 142 includes a coupling end 144.

Figure 6:
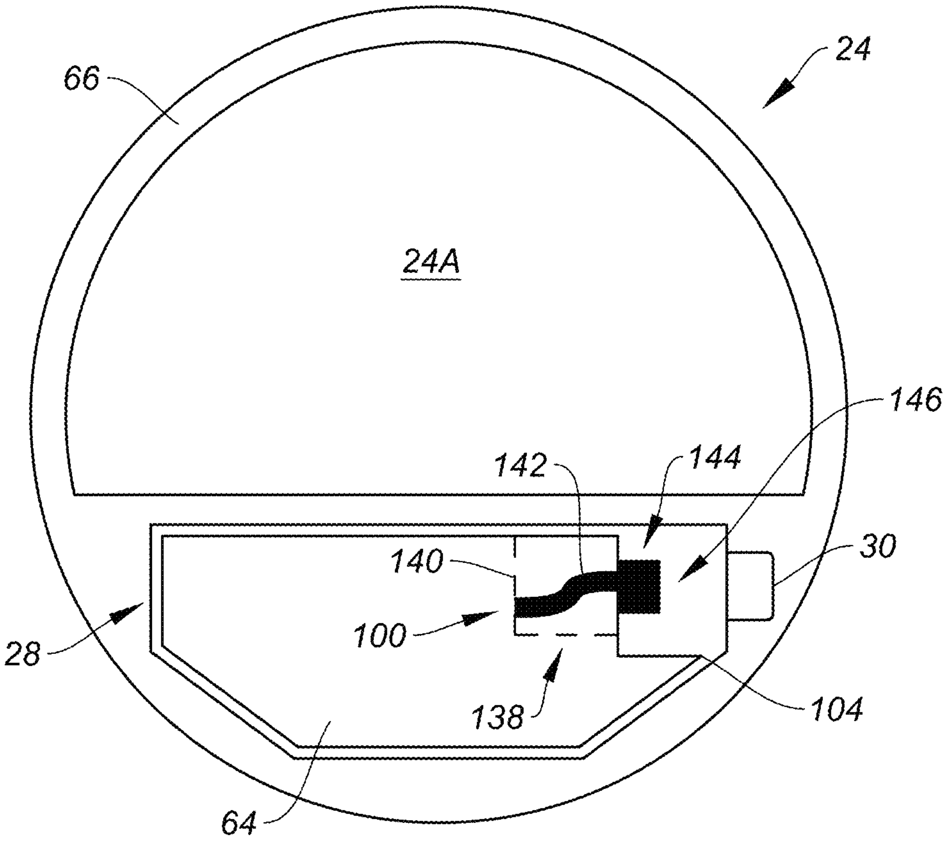
FIGS. 6-8 are partial diagrammatic cross-sectional illustrations of a removable water tank and a water storage compartment during various steps of engagement according to an embodiment of the present disclosure.
Figure 7:
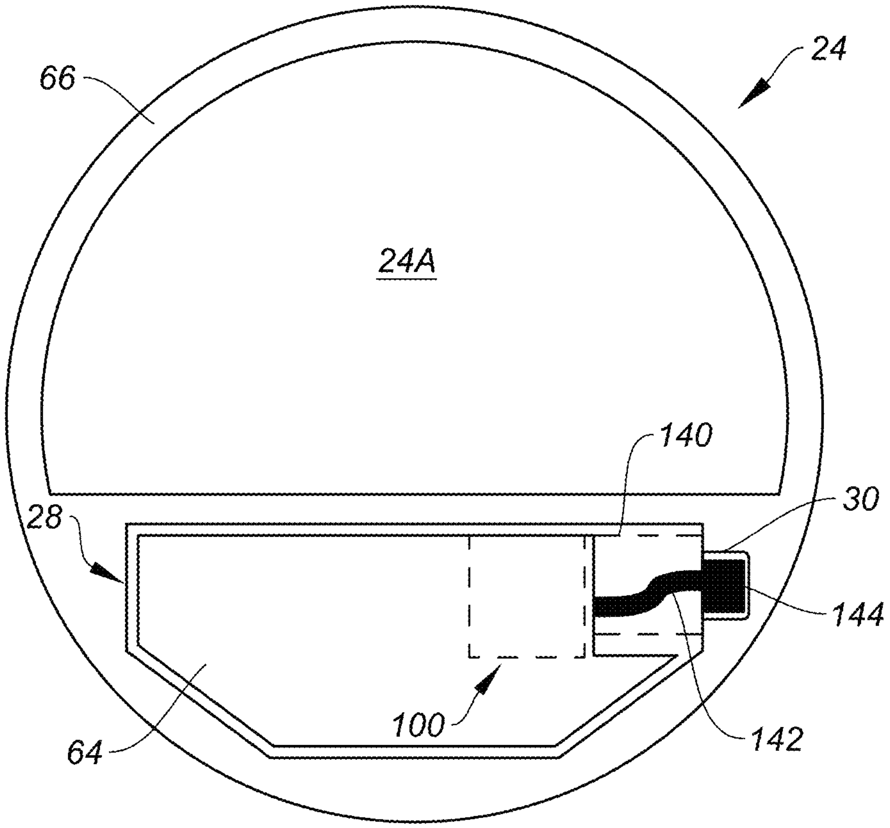
Figure 8:
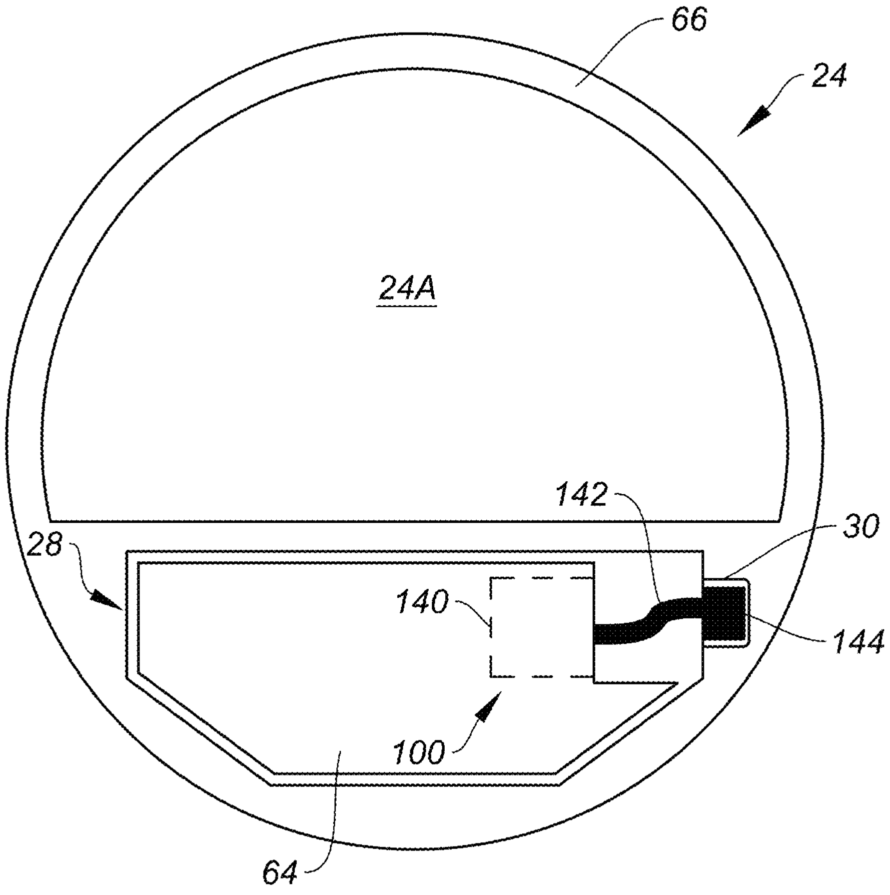
Figure 10:
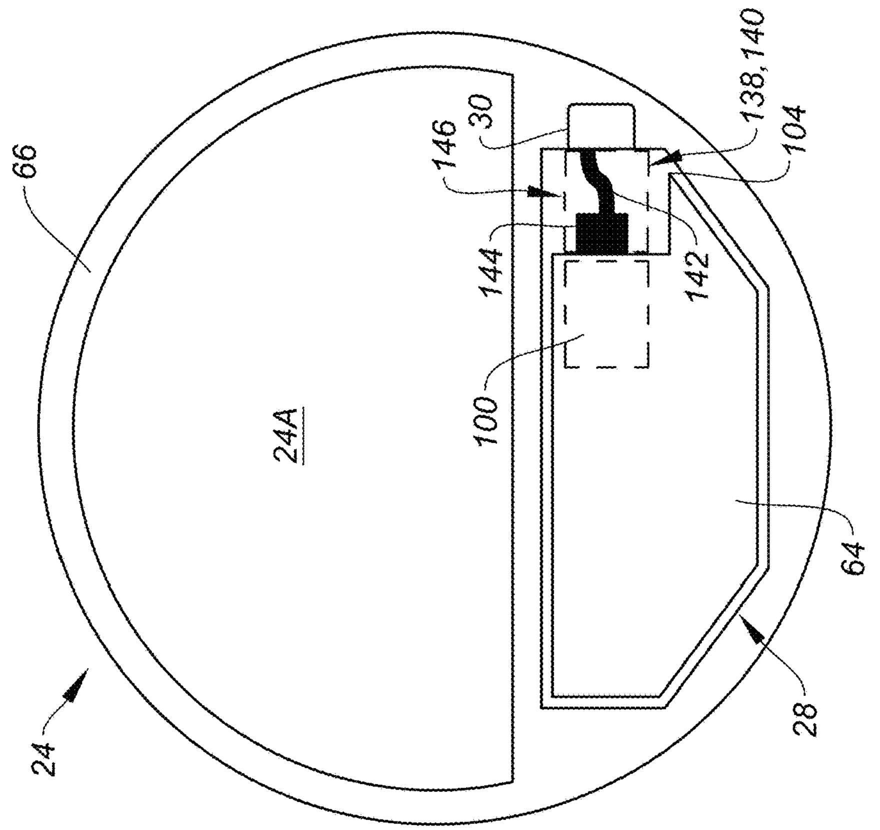
FIGS. 9 and 10 are partial diagrammatic cross-sectional illustrations of a removable water tank and a water storage compartment during various steps of engagement according to an embodiment of the present disclosure
Figure 9:
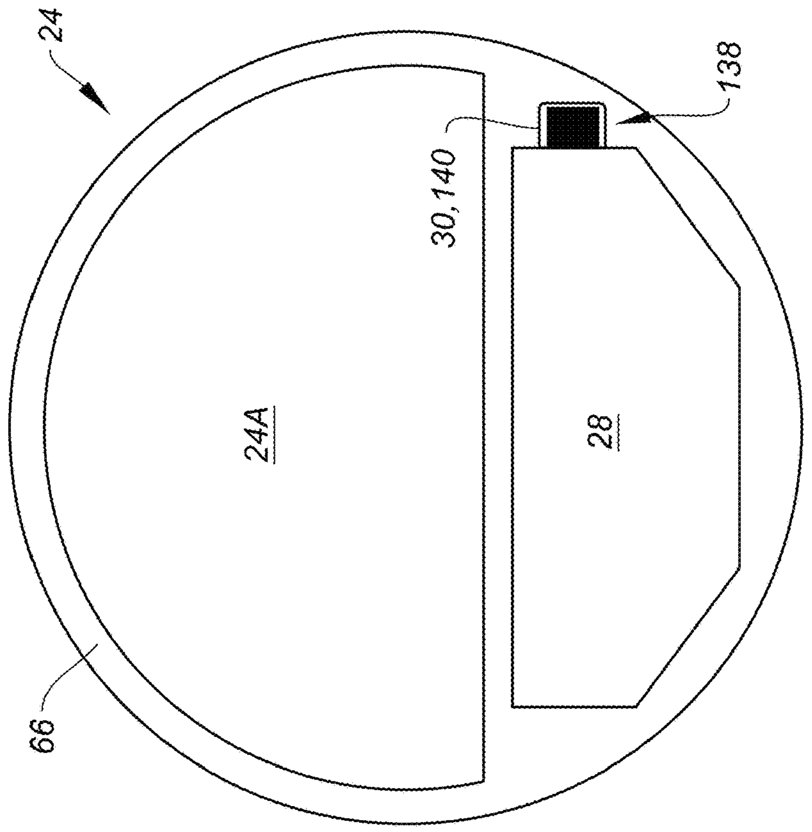

FIGS. 6-8 diagrammatically illustrate a method of engaging the removable water tank 64 with the water storage compartment 28 of the present disclosure. Referring to FIG. 6, the removable water tank 64 is disposed within the water storage compartment 28 in a disengaged position. The water tank 64 includes a notch 146 removed from the exterior surface 104 of the water tank 64 (e.g., a lateral side of the removable water tank 64) which includes the coupling system 138. The coupling system 138 includes the connector arm 140 and the flexible connector 142. The flexible connector 142 includes the coupling end 144. The coupling end 144 is sized to fit within and engage the manifold 30 of the water storage compartment 28 in a removable, fluid-tight mechanical engagement. The coupling system 138 may be arranged with or otherwise form a part of the connector box 100. Other locations for the coupling system 138 are not meant to be precluded. For example, the coupling system 138 of FIGS. 9 and 10 depicts the flexible connector 142 and coupling end 144 disposed within the manifold 30 of the water storage compartment 28, which may extend from the manifold 30 for removable engagement with the water tank 64. Any of the manifold 30, the water tank 64, or both may include the coupling system 138 of the present disclosure.

In some embodiments, referring to FIGS. 6-8, the coupling system 138 is arranged with the connector box 100 of the removable water tank 64. The connector arm 140 may include or otherwise form a part of the latching mechanism 134 (FIG. 5A). Similarly, the flexible connector 142 may include or otherwise form a part of one or more components of the connector box 100, such as the electrical connector 128, supply port 130, and/or return port 132. The flexible connector 142 of FIG. 6 extends within the connector box 100 of the water tank 64 and includes the coupling end 144. The connector arm 140 is configured to extend and retract from the connector box 100 to perform engagement and release operations of the flexible connector 142 and coupling end 144 with the manifold 30 of the water storage compartment 28.

Upon actuation of the connector box 100, the connector arm 140 and the flexible connector 142 will begin to extend from the exterior of the removable water tank 64. Referring to FIG. 7, the connector arm 140 extends from the connector box 100 and removable water tank 64 towards the manifold 30. During the extension, the connector arm 140 will carry the flexible connector 142 towards the manifold 30, such that the coupling end 144 can become engaged with the manifold 30. Upon establishing engagement of the coupling end 144 with the manifold 30, the connector arm 140 will retract to within the connector box 100 as depicted in FIG. 8, leaving the flexible connector 142 and coupling end 144 secured to the manifold 30, thereby establishing fluid communication, as well as electrical communication, with the manifold 30.

During engagement, the flexible connector 142 will prevent G-force movements from disengaging the coupling end 144 from the manifold 30. Actuation of the connector box 100 may be accomplished mechanically (e.g., using a level) and/or electronically (e.g., using an electric motor in communication with the controller 108). Other forms of actuation are not meant to be precluded.

Removal operations of the coupling end 144 from the manifold 30 are accomplished in a manner similar, but opposite to the manner of engagement. The connector arm 140 of FIG. 8 will extend from the connector box 100 towards the coupling end 144 and subsequently disengage the coupling end 144 from the manifold 30 (see FIG. 7). Upon disengagement, the connector arm 140 will retract towards the connector box 100, returning the flexible connector 142 and coupling end 144 to the retracted position within the connector box 100 (see FIG. 6).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and subcombinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A system for an aircraft, comprising:
a propulsion unit;
a water augmentation system;
an airframe including a water storage compartment and a water delivery system, the water delivery system in fluid communication with the water augmentation system and the water storage compartment;
a removable water tank receivable within the water storage compartment and configured for fluid communication with the water augmentation system; and
a coupling system configured to transition between an extended position and a retracted position, wherein in the extended position, the coupling system is disposed between the removable water tank and the water delivery system, and in the retracted position, the coupling system is disposed within the removable water tank or the water delivery system.

2. The system of claim 1, wherein
the coupling system includes a connector arm and a flexible connector;
the connector arm movable between the extended position and the retracted position to transition the flexible connector between an engaged condition and a disengaged condition;
in the engaged condition the coupling system is secured to a manifold of the water delivery system and the removable water tank such that fluid communication is established between the manifold and the removable water tank.

3. The system of claim 1, wherein the coupling system is arranged with the removable water tank.

4. The system of claim 1, wherein
the water delivery system includes a manifold; and
the coupling system is arranged with the manifold.

5. The system of claim 1, wherein the water storage compartment is arranged with a cargo hold of the airframe.

6. The system of claim 5, wherein the water storage compartment is arranged in the cargo hold such that other items may be stored and removed without removing the removable water tank.

7. The system of claim 1, wherein
the removable water tank includes an actuator and a latching mechanism;
the latching mechanism is configured to transition between a locked position and an unlocked position, wherein, in the locked position, the latching mechanism engages the water delivery system and, in the unlocked position, the latching mechanism is disengaged from the water delivery system;
the actuator is configured to transition the latching mechanism between the locked position and the unlocked position.

8. The system of claim 1, wherein
the removable water tank includes a supply port, a return port, and an electrical connector;
the supply port disposed on an exterior surface of the removable water tank and in fluid communication with a supply reservoir, the supply reservoir configured to store source water usable by the water augmentation system, the supply reservoir disposed within a water tank interior;
the return port disposed on the exterior surface of the removable water tank and in fluid communication with a drain reservoir, the drain reservoir disposed within the water tank interior; and
the electrical connector is configured to establish an electrical connection between the removable water tank and the water augmentation system.

9. The system of claim 8, wherein
the aircraft includes an electronic engine controller;
the removable water tank includes a controller; and
the electrical connector is configured to establish electrical communication between the controller and the electronic engine controller.

10. The system of claim 8, wherein the water delivery system is configured to supply water from the supply reservoir to the water augmentation system and to purge water from the water augmentation system to the drain reservoir.

11. The system of claim 1, wherein the water augmentation system is configured to inject water into a combustor section to reduce an exit temperature of combustion gases exiting the combustor section.

12. The system of claim 1, further wherein
the water delivery system includes a plurality of water transport lines and a manifold;
the plurality of water transport lines fluidly connecting the manifold to the water augmentation system, and the plurality of water transport lines integrated into the airframe and configured to direct water from the water storage compartment, through the manifold, to the water augmentation system.

13. An aircraft propulsion system comprising:
a propulsion unit including a core flowpath, a compressor section and a combustor;
a water augmentation system including at least one location where water is communicated into the core flowpath;
an airframe including a water storage compartment;
a water delivery system configured to supply water to the water augmentation system
a water tank configured to store and supply water to the water delivery system, the water tank removably mounted with the water storage compartment;
a controller programmed to control a flow of the water from the water tank to the water augmentation system; and
a coupling system configured to removable couple the water delivery system and water tank in fluid communication, the coupling system including a connector arm and a flexible connector, the connector arm movable between an extended position and a retracted position to transition the flexible connector between an engaged condition and a disengaged condition;

wherein the coupling system is fluidly coupled to the water delivery system and the water tank in the engaged condition.

14. The aircraft propulsion system of claim 13, wherein the water delivery system includes a manifold and water transport lines;

the water transport lines fluidly connecting the manifold to the water augmentation system, the water transport lines integral with the airframe;

the manifold in fluid communication with the water storage compartment.

15. The aircraft propulsion system of claim 13, wherein the water storage compartment comprises a portion of a cargo hold within the airframe.

16. The aircraft propulsion system as recited in claim 13, wherein the water tank includes a supply port, a return port, and an electrical connector;

the supply port disposed on an exterior surface of the water tank and in fluid communication with a supply reservoir, the supply reservoir configured to store source water usable by the water augmentation system, the supply reservoir disposed within a water tank interior;

the return port disposed on the exterior surface of the water tank and in fluid communication with a drain reservoir, the drain reservoir disposed within the water tank interior; and the electrical connector is configured to establish an electrical connection between the water tank and the water augmentation system.

17. A removable water tank for use with a water augmentation system of an aircraft, comprising:

a body including a tank base, a tank top, and tank sidewalls connecting base and the top;

an interior including a supply reservoir, a drain reservoir, a pump and a water quality sensor, the supply reservoir configured to store source water usable by the water augmentation system, and the drain reservoir configured to store purge water used by the water augmentation system;

a supply port disposed on an exterior surface of the tank body and in fluid communication with the supply reservoir;

a return port disposed on the exterior surface of the removable water tank and in fluid communication with a drain reservoir; and a coupling system configured to secure the tank body to the aircraft in an engaged condition, and release the tank body from the aircraft in a disengaged condition.

18. The removable water tank of claim 17, further comprising an electrical connector configured to establish an electrical connection between the removable water tank and the water augmentation system.

19. The removable water tank of claim 17, further comprising an actuator configured to transition the coupling system between the engaged condition and the disengaged condition.

* * * * *